though it may be adjusted as desired. Two chutes 35, 36 diverge downwardly and rear-

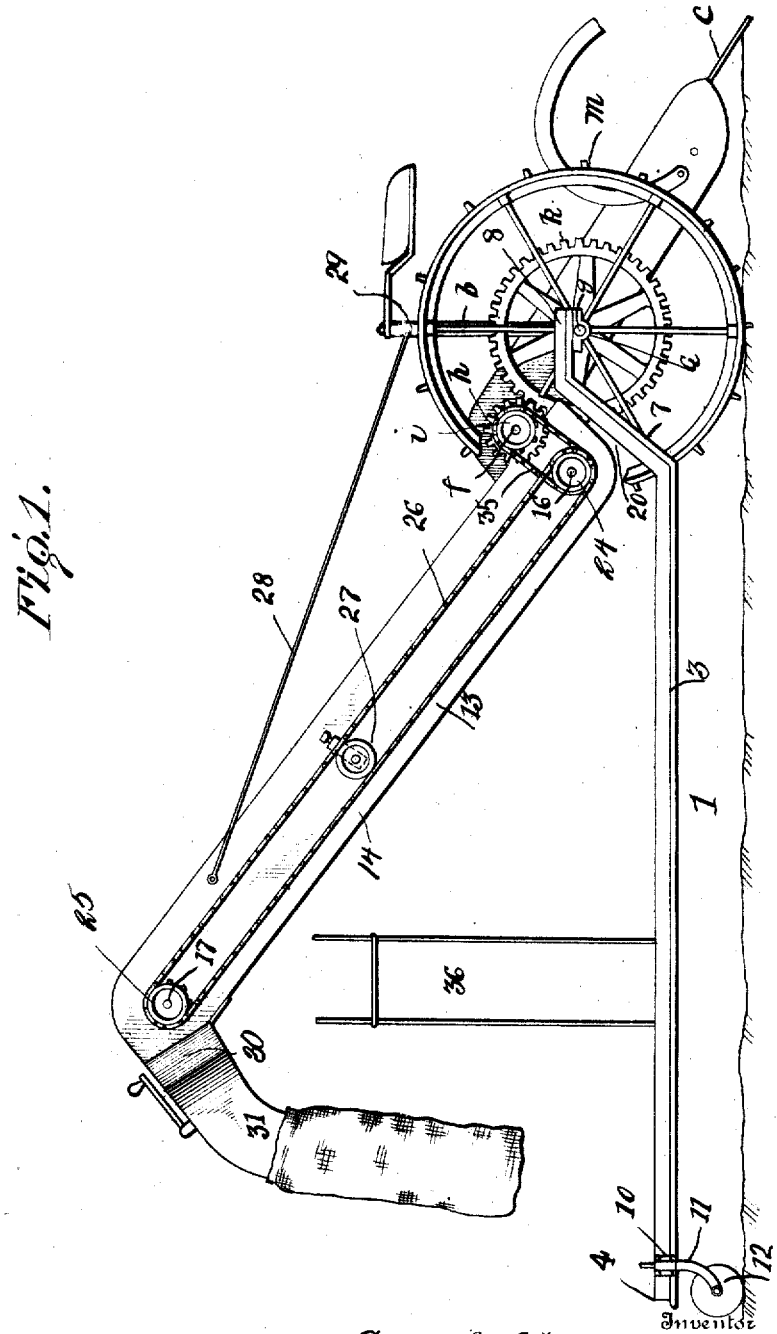

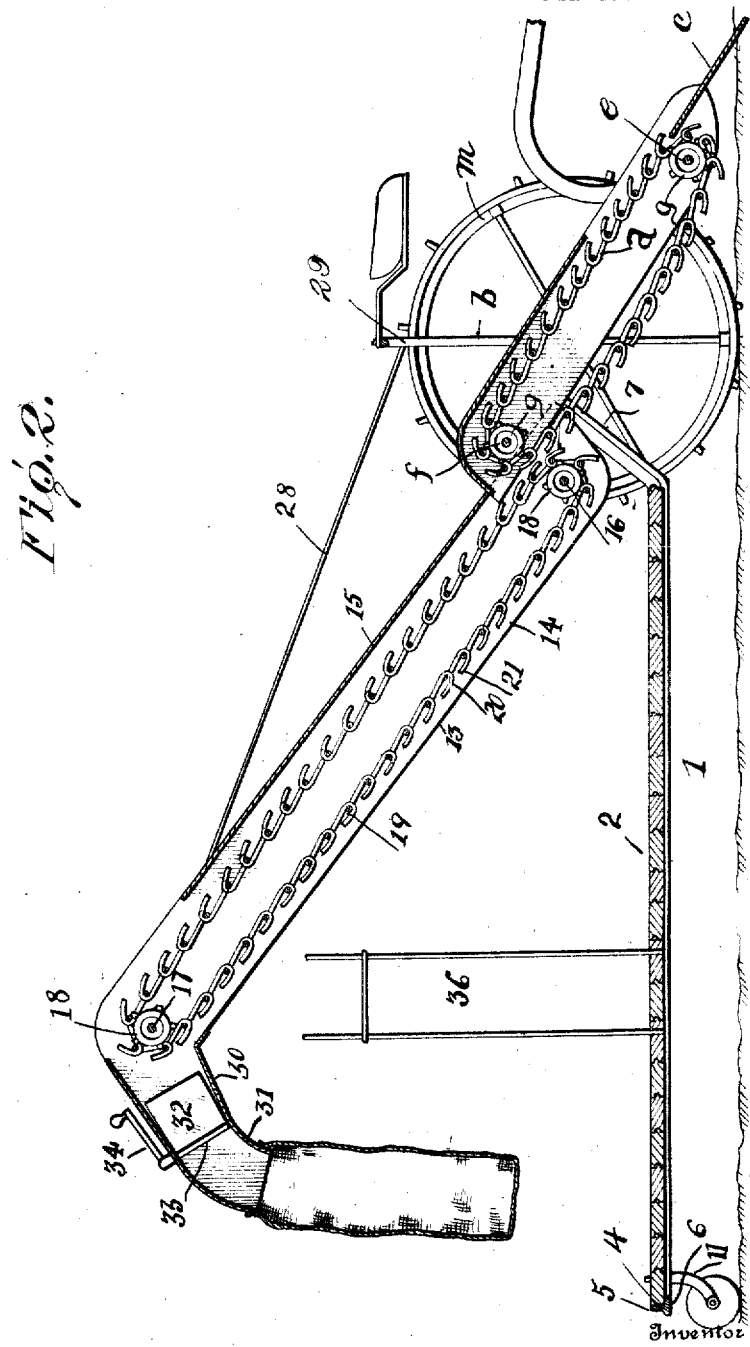

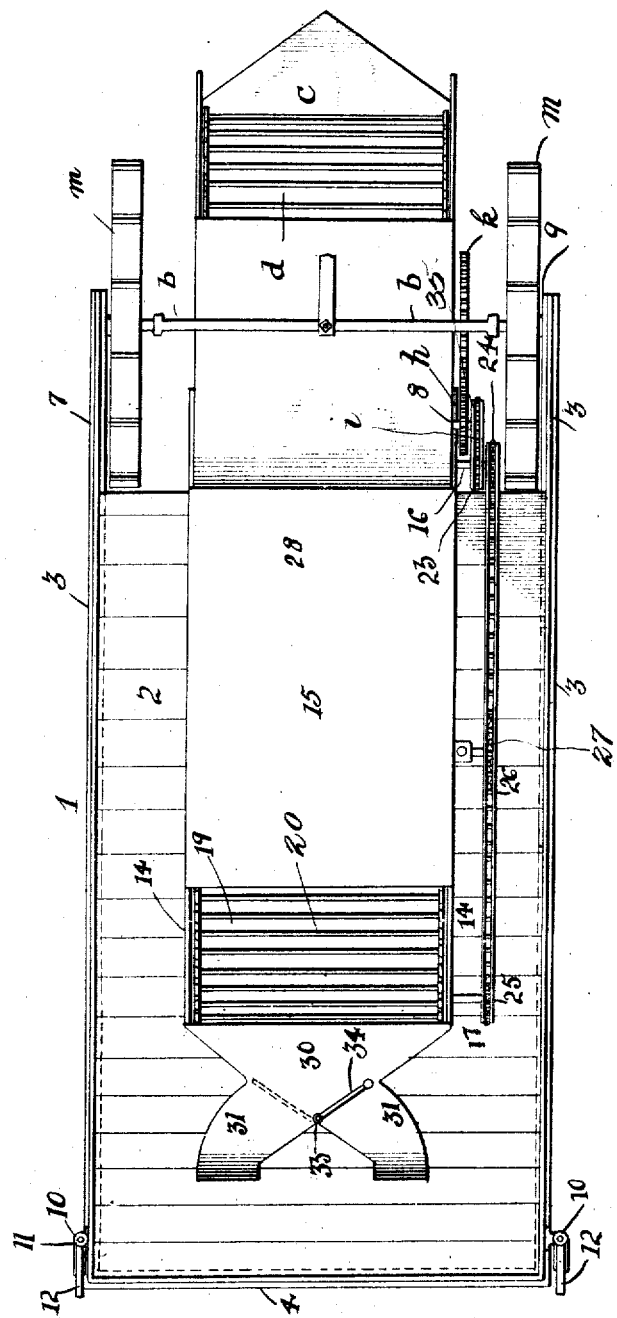

UNITED STATES PATENT OFFICE.

GUS A. AKERS, OF COVENTRY, COLORADO, ASSIGNOR OF ONE-FOURTH TO CHARLES H. SMITH, OF COVENTRY, COLORADO.

SACKING AND ASSORTING ATTACHMENT FOR POTATO-HARVESTERS.

998,445.  Specification of Letters Patent.  Patented July 18, 1911.

Application filed July 2, 1909. Serial No. 505,622.

*To all whom it may concern:*

Be it known that I, GUS A. AKERS, a citizen of the United States, residing at Coventry, in the county of Montrose and State of Colorado, have invented new and useful Improvements in Sacking and Assorting Attachments for Potato-Harvesters, of which the following is a specification.

This invention relates to improvements in sacking and assorting attachments for use in connection with potato digging machines to cause the potatoes dug by the machines to be elevated therefrom, assorted as to size and deposited in sacks or bags, the object of the invention being to provide an attachment of this kind which may be readily applied to and used in connection with a potato digging machine such as are now in common use.

The invention consists in the construction, combination and arrangement of devices hereinafter described and claimed.

In the accompanying drawings:—Figure 1 is an elevation of a potato assorting and sacking attachment constructed in accordance with this invention showing the same connected to the rear truck of a potato digging machine. Fig. 2 is a vertical longitudinal sectional view of the same. Fig. 3 is a plan of the same.

In accordance with this invention a platform is provided which is here shown as comprising a frame 1 and floor boards 2. The frame comprises longitudinal side bars 3 and a rear cross bar 4 which connects them together, each of the said bars being cross sectionally of inverted T-shape so that said bars are provided each with a vertical web 5 and a horizontal base web 6. The said side bars 3 are provided with up-turned forwardly inclined portions 7 near their front ends and their front ends 8 are provided on their under side with bearings 9 adapted to be engaged with and mounted on the spindles *a* of the axle shaft *b* of the potato digging machine. The floor boards are disposed transversely to the frame 1, lie on base flanges 6 of the bars of said frame and bear against the vertical webs 5 of said bars. Near the rear corners of the platform frame are bearings 10 for the upper ends of forks 11 which carry caster wheels 12 which run on the ground in rear of the machine and hence enable the platform to be trailed behind the machine. An elevator frame 13 which is inclined comprises sides 14 and a cover 15 which connects the said sides together and extends from a point near their lower ends to a point near their upper ends. A pair of shafts 16, 17 are respectively journaled in bearings near the lower and upper ends of the said sides 14 and are provided with sprocket wheels 18 on which operates an endless elevating carrier 19 which comprises cross bars 20 the ends of which are bent at right angles to form hooks 21, the hooks of each cross bar pivotally engaging the next adjacent cross bar. The said cross bars are spaced apart an appropriate distance according to the length of the hooks with which they are formed and according to the size of the potatoes to be sacked, the spaces between the cross bars of the elevator carrier corresponding with the size of the smaller potatoes which it is not desired to sack and hence the small potatoes drop through the spaces between the said bars of the elevator carrier, while the larger potatoes remain on the upper lead of the carrier and are conveyed thereby to the upper end of the elevator frame.

The shaft 16 is provided near one end with sprocket wheels 23—24. The shaft 17 has at the corresponding end a sprocket wheel 25. An endless sprocket chain 26 connects the sprocket wheels 24—25 to transmit power from the lower shaft 16 to the upper shaft 17 and a tightener 27 is provided for the said sprocket chain 26 as shown in Fig. 1. The elevator frame is supported in inclined position by guide rods 28 which are attached at their rear ends to the said frame at a point near the rear upper end of the latter and have their front ends attached to the arch bar *b'* of the machine as at 29.

Any well known additional means may be employed for supporting the carrier frame 13 upon the platform.

At the rear upper end of the elevator frame is a discharge casing 30 which is formed with a pair of downwardly and rearwardly extending discharge spouts 31 which diverge and between which is a valve or divider 32 which is pivotally mounted as at 33 at the angle between the said spouts and is here shown as provided at the upper end of its pivotal axis with a lever 34 whereby it may be turned in the required direction to cut off either of the spouts and open the other.

The plow, scoop or digger c of the digging machine causes the potatoes to be caught and carried upwardly and rearwardly by the inclined endless carrier d of the machine which carrier is of the same construction as the carrier 19 of the elevator. e and f are respectively the lower and upper shafts of said carrier d, the sprocket wheels on said shafts which engage and operate said carrier being shown at g. The shaft f is provided with a spur gear h and a sprocket wheel i. Said sprocket wheel is connected to the sprocket wheel 23 of the lower shaft 16 of the elevator by an endless sprocket chain 35. A spur gear k on the shaft of the potato digging machine engages the gear h and hence it will be understood that when the machine is in operation both carriers d and 19 are actuated and their upper leads caused to move upwardly and rearwardly. It will be observed upon reference to the drawings that the lower portion of the elevator carrier is disposed below the upper portion of the carrier d of the digging machine so that the potatoes are discharged from the carrier of the digging machine onto the elevator carrier. As hereinbefore stated, the smaller potatoes drop through the spaces between the bars of the elevator carrier onto the platform or may be received in boxes or other receptacles thereon while the larger potatoes are discharged from the rear of the elevator carrier to the discharge casing or trunk 30 and pass by gravity therefrom through either one of the discharge spouts 31 to a sack attached to said spout according to the position of the divider or valve, the operators stationed on the platform operating the valve manually as required to cause potatoes to be delivered to one sack or bag while another sack or bag is being attached to or removed from the other spout. A sack holder is indicated at 36 on the platform. The traction wheels of the potato digging machine are shown at m.

What is claimed is:—

1. In a sacking and assorting attachment for potato harvesters, a wheeled platform, a carrier-belt having its forward end disposed forwardly and below the plane of the platform and inclined upwardly therefrom, a second upwardly inclined carrier having its forward end disposed immediately beneath the rear of the first carrier, a frame supporting the first carrier, a shovel carried by the frame and located in advance of the said first carrier, means for simultaneously driving the carriers, a sacking attachment located rearwardly of the second named carrier, and a frame forming a part of the sacking attachment and supporting the said second named carrier.

2. A sacking and assorting attachment for potato harvesters comprising a portable horizontally disposed platform, a carrier located in advance of the platform and extending forwardly and downwardly at an angle thereto so that its lower end is disposed below the plane of the platform, a shovel located in advance of the carrier, a supporting frame for the carrier, a second carrier extending upwardly and rearwardly from the platform and having its forward end disposed beneath the rear end of the first named carrier, means for simultaneously driving the carriers, a frame supporting the second carrier and provided with an open bottom portion which is disposed immediately above the platform, and a sacking attachment supported by the second named frame.

In testimony whereof I affix my signature in presence of two witnesses.

GUS A. AKERS.

Witnesses:
JOHN M. PHILLIPS,
JAMES P. GALLOWAY.

Copies of this patent may be obtained for five cents each, by addressing the "Commissioner of Patents, Washington, D. C."